US 6,662,904 B2

(12) United States Patent
Omote et al.

(10) Patent No.: US 6,662,904 B2
(45) Date of Patent: Dec. 16, 2003

(54) FRICTION ENGAGEMENT ELEMENT WITH LUBRICATION

(75) Inventors: Kenji Omote, Anjo (JP); Takeshi Inuzuka, Anjo (JP); Shigeo Tsuzuki, Anjo (JP); Mitsuhiro Umeyama, Toyota (JP); Hisanori Nomoto, Toyota (JP); Yuji Iwase, Toyota (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 22 days.

(21) Appl. No.: 09/956,264

(22) Filed: Sep. 20, 2001

(65) Prior Publication Data

US 2002/0036120 A1 Mar. 28, 2002

(30) Foreign Application Priority Data

Sep. 22, 2000 (JP) .......................................... 2000-289643

(51) Int. Cl.$^7$ .............................. F01M 3/00; F16D 13/72
(52) U.S. Cl. ................. 184/6.2; 192/70.12; 192/113.34
(58) Field of Search ....................... 184/6.12; 192/70.12, 192/113.34, 113.36

(56) References Cited

U.S. PATENT DOCUMENTS

| | | | | | |
|---|---|---|---|---|---|
| 4,624,650 | A | * | 11/1986 | Hiruma et al. ........... | 192/70.12 |
| 5,755,314 | A | * | 5/1998 | Kanda et al. ............ | 192/70.12 |
| 5,960,919 | A | * | 10/1999 | Yokoyama et al. ....... | 192/70.12 |
| 5,961,419 | A | * | 10/1999 | Hisano et al. ............ | 184/6.12 |
| 5,967,929 | A | * | 10/1999 | Matsuoka et al. ........ | 192/70.12 |
| 5,975,260 | A | * | 11/1999 | Fischer et al. ........... | 192/113.36 |
| 6,029,786 | A | * | 2/2000 | Sommer ................. | 192/113.36 |
| 6,062,367 | A | * | 5/2000 | Hirayanagi et al. ..... | 192/113.36 |
| 6,283,265 | B1 | * | 9/2001 | Hirayanagi et al. ...... | 192/70.12 |
| 6,394,243 | B1 | * | 5/2002 | Sasse ..................... | 192/113.34 |

FOREIGN PATENT DOCUMENTS

| JP | 9-60660 | 3/1997 |
|---|---|---|
| JP | 2001-108074 | 4/2001 |

\* cited by examiner

Primary Examiner—David A. Bucci
Assistant Examiner—Bradley J. Van Pelt
(74) Attorney, Agent, or Firm—Lorusso, Loud & Kelly (57) ABSTRACT

A lubricating apparatus, for a friction engagement element that engages a rotatable member with a case includes a hub connected to the rotatable member, friction members disposed between the hub and the case, a hydraulic servo for engaging the friction members, and an oil passage for supplying lubricant from the case to the friction members. A discharge opening of the oil passage is formed at a position which is radially inward of the friction members and which is axially to a side of the friction members. The discharge opening is directed toward the friction members. A weir member for restricting escape of lubricant in the axial direction through a gap between the hub and the friction members is provided at the other axial side of the friction members. Therefore, the axial escape of lubricant exiting the friction members can be prevented by a non-contact leakage restriction that does not cause drag resistance. The radially outward stream of oil between the friction members is secured, and the friction members can be reliably cooled to remove heat generated by slip control of the friction engagement element.

11 Claims, 6 Drawing Sheets

|  |  | C1 | C2 | B1 |
|---|---|---|---|---|
|  | ① ENG. START | X | X | O |
| FORWARD | ② ETC | X | O | X |
| FORWARD | ③ M/G RUN | O | X | X |
| FORWARD | ④ LOCKED-UP RUN | O | O | X |
| REVERSE | ⑤ FRICTION START | O | X | X → O |
| REVERSE | ⑥ M/G RUN | O | X | X |

FRICTION ENGAGEMENT ELEMENT WITH LUBRICATION

INCORPORATION BY REFERENCE

The disclosure of Japanese Patent Application No. 2000-289643 filed on Sep. 22, 2000, including the specification, drawings and abstract, is incorporated herein by reference in its entirety.

BACKGROUND OF THE INVENTION

1. Field of the Invention

The invention relates to a friction engagement element combined with a lubrication system therefor and, more particularly, to a lubricating apparatus for supplying a large quantity of oil to friction members of a friction engagement element.

2. Description of the Related Art

An example of a brake employed in an automatic transmission to stop a rotatable element of a transmission mechanism is a friction engagement element of the wet multiple disc type. The conventional friction engagement element employed as a brake of an automatic transmission is controlled so that the engagement is completed in a short time and is exclusively used for speed shifts since the automatic transmission has a vehicle starting device such as a torque converter or the like. Therefore, although a transitional slipping state may occur during an engagement operation, no control operation is performed to intentionally keep friction members in a slipping state. The friction members of the friction engagement element are lubricated and cooled by lubricating oil released outward, by centrifugal force, from a supply opening of a lubricant passage formed in a rotating shaft located radially inward of the friction members. The lubricating oil splashed onto the friction members passes between the friction members thus lubricating various portions of the mechanism.

If a friction engagement element as described above is used as an engagement element in starting in motion a vehicle having a hybrid drive or a CVT (continuously variable transmission), i.e., a vehicle that is not equipped with a starting device such as a torque converter or the like, the friction engagement element must be slip-controlled for a considerably long period of time, unlike a friction engagement element employed for the purpose of a speed shift. In such slip control, a large quantity of heat is generated by the friction members, so that a large amount of lubricating oil must be supplied for cooling. Therefore, it becomes necessary to provide a lubricant passage (that allows a flow of about 7000 cc/min) separate from a conventional lubricant passage (that normally allows a flow of several hundred cc/min) provided for lubricating various portions of the mechanism.

An example of the above-described vehicle-starting clutch is disclosed in Japanese Patent Application Laid-Open No. HEI 9-60660. The disclosed structure includes a clutch cooling oil passage formed in a rotating shaft and a hub of a clutch drum fixed to the rotating shaft so that oil is supplied, by centrifugal force, from a supply opening formed in the drum-side of the hub that opens radially inward in the direction of the clutch hub and toward a friction member disposed between the clutch drum and the clutch hub. Escape of oil from a gap between the friction member and the clutch hub in a direction parallel to the axis of the clutch hub is prevented by a seal ring disposed between the clutch hub and a flange on an end portion of the friction member, so that substantially the entire amount of oil supplied to the friction member flows through the friction element.

A seal ring provides substantially complete prevention of oil supplied to the friction element from leaking in the axial direction, and thereby effectively reduces the loss of the supplied oil. However, in general, prevention of leakage by employment of a seal ring disposed between members that rotate relative to each other increases the friction loss due to the contact with the seal ring. Therefore, the above-described conventional structure is effective in a transmission wherein the increased sliding resistance does not pose a serious problem and, in particular, in a clutch wherein friction loss due to the sliding contact occurs only for a short period of time and wherein, during ordinary operation, there is no relative rotation between the friction member and the clutch hub. However, the above-described conventional structure is disadvantageous if incorporated into a hybrid drive train wherein increased sliding resistance should be avoided and, in particular, a brake wherein there is relative rotation between the friction member and the hub during normal operation.

SUMMARY OF THE INVENTION

Accordingly, it is an object of the invention to provide a friction engagement element (clutch or brake) lubricating system that is able to sufficiently cool and lubricate the friction members of the friction engagement element while reducing the loss of lubricant, without increase in sliding resistance even in controlled slippage.

In order to achieve the aforementioned and other objects, the present invention provides an apparatus including a friction engagement element and lubricating system therefor. The friction engagement element is arranged for engaging a rotating member with a case, and includes a hub connected to the rotating member, and at least one friction member disposed between the hub and the case, and an oil passage for supplying a lubricant from the case to the friction member. At least one discharge opening of the oil passage is provided radially inward of and to a first axial side of the friction element, which discharge opening is directed toward the friction member(s). A weir member is provided at a second axial side of the friction element to restrict escape of the lubricant axially through a gap between the hub and the friction member(s).

Therefore, the friction engagement element lubrication of the invention has a simple construction, yet is able to adequately lubricate the friction element. Furthermore, the apparatus prevents oil supplied from the first side in the axial direction from escaping toward the second side, and is able to hold oil at the radially inward side of the friction element.

In the above-described apparatus, the hub and the friction member may be connected by a spline arrangement in which keys (splines) are omitted at spline sites equidistantly and circumferentially spaced.

Therefore, the oil supplied to the radially inward side of the friction element can be uniformly distributed both axially and circumferentially to the entire space occupied by the friction element via the key-omitted sites. Hence, the entire friction element can be uniformly lubricated and cooled. Furthermore, the construction in which the key-omitted sites on the hub are utilized for delivery of lubricant in the axial direction is advantageous in eliminating the need for position alignment during the assembly step of mounting a plurality of friction members on the hub, and therefore provides easier assembly as compared with assembly of a prior art structure in which delivery of lubricant in the axial direction is accomplished by omitting keys on the friction members of the friction element or by forming an oil passage in the friction members.

The weir member may extend to a location that is radially inward of the outer periphery of the keys (splines) on the hub, to prevent the oil delivered through the sites where keys are omitted from the hub-side spline arrangement from escaping through a gap between the hub and the friction element.

The friction engagement element lubricating apparatus may further include a reaction member that is provided at a first axial side of the friction element and is supported by the case to bear the force exerted on the friction element by actuation of the hydraulic servo, wherein the oil passage is connected to a lubricant supply passage provided in the case, and wherein the oil passage and the oil discharge opening of the oil passage are formed in the reaction member. Hence, it becomes unnecessary to extend the case radially inward for the purpose of introducing lubricant. Furthermore, due to location of the oil passage in the reaction member, the number of component parts forming the lubricant passage is reduced.

The apparatus may further include return springs located radially outward of the friction member and extending between the weir member and the reaction member. Therefore, the weir member and the reaction member serve as return spring supports that are indispensable in the friction engagement element. Hence, it becomes possible to further reduce in number the component parts of the lubricating apparatus.

The oil passage may be a groove formed in the reaction member and closed by a lid member attached to the reaction member, and this oil passage may be connected with the lubricant supply passage formed in the case by an oil passage defined by a circumferential groove formed in the reaction member and the lid member. In this manner, the oil passage can be formed by an inexpensive processing method such as die-casting or the like. Still further, in comparison with a construction in which an oil passage is formed in a single member, the axial dimension, i.e, thickness, of the member forming the oil passage is reduced, allowing the overall axis dimension of the entire apparatus to be reduced.

The above-described apparatus may use plural discharge openings, optionally arranged around the circumference of a circle and optionally facing each other. Therefore, circumferential-direction unevenness in the supply of lubricant to the radially inward side of the friction member can be reduced. Hence, the supply of lubricant to the friction member can be made uniform in the circumferential direction as well, and unevenness in lubrication and cooling can be reduced.

Further, in the above-described apparatus, the friction member may have a cutout in the radially outward portion of the friction member. Therefore, the oil that has cooled the friction member and has reached the radially outward portion of the friction member can be moved in the axial direction to improve the oil discharge.

Alternatively, in the above-described apparatus, the reaction member may have a cutout in a surface of the reaction member that faces the case. Therefore, the discharge of the oil after cooling the friction member and reaching of the radially outward portion of the friction member can be improved.

The apparatus of the present invention may further include an engine, a planetary gear unit having at least three elements, and a transmission, wherein the output shaft of the engine is connected to one of the elements of the planetary gear unit, wherein an input shaft of the transmission is connected to another one of the elements of the planetary gear unit, and wherein the friction member is a brake for engaging still another one of the elements of the planetary gear unit with the case.

Therefore, through the slip control of the brake friction member, the rotation input to the transmission can be gradually increased in a direction of rotation opposite that of the engine.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described hereinafter with reference to the accompanying drawings.

Figure 1:
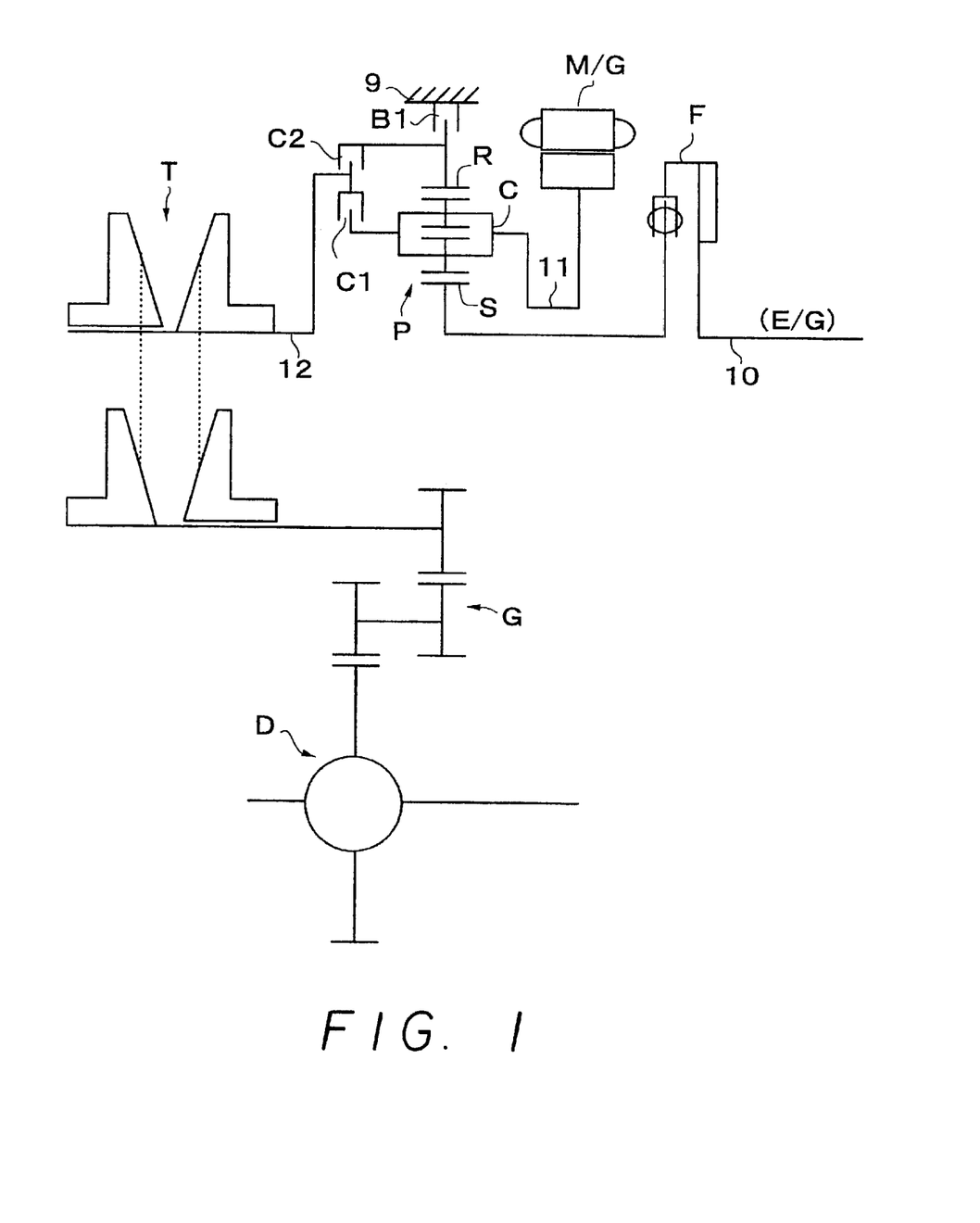
FIG. 1 is a skeletal diagram of a hybrid drive apparatus to which the invention is applied.

The skeletal diagram of FIG. 1 shows a vehicular hybrid drive, to which the invention is applied, as including an engine (E/G) (whose configuration is not shown), a motor generator (M/G), a continuously variable transmission T (a CVT), and a differential D, as major elements. The engine (E/G), the motor generator (M/G) and the transmission T are interconnected by a double-pinion planetary gear unit P which also serves as a forward-reverse drive switching mechanism. The transmission T is connected to the differential D via a counter gear mechanism G.

The planetary gear unit P includes a sun gear S connected to an output shaft 10 of the engine (E/G) via a flywheel F. A carrier C is connected to a rotor shaft 11 of the motor generator (M/G). The planetary gear unit P connects to an input shaft 12 of the transmission T via two output paths, that is, an output path via the carrier C and another output path via a ring gear R. Two clutches C1, C2 and one brake B1 are provided as friction engagement elements for switching between the two output paths. The first clutch C1 is disposed between the carrier C and the input shaft 12 of the transmission T. The second clutch C2 is disposed between the ring gear R and the input shaft 12 of the transmission T. The brake B1 is disposed between the ring gear R and a case 9.

Figure 2:
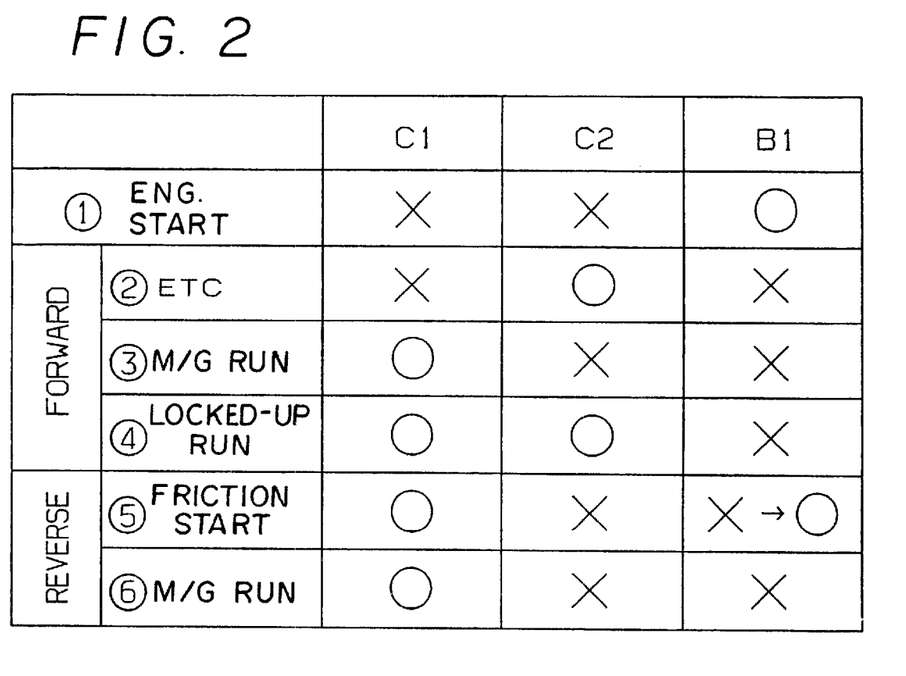
FIG. 2 is a table showing relationship between operations of friction engagement elements and operational modes of the hybrid drive apparatus.
Figure 3:
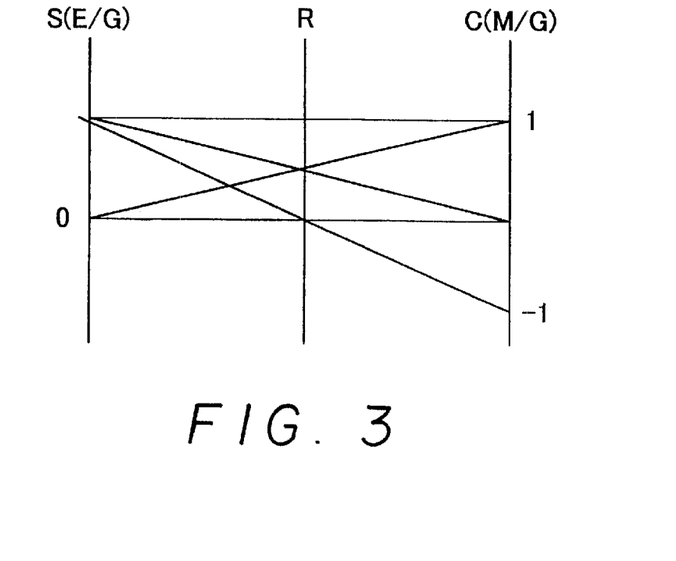
FIG. 3 is a speed line diagram indicating operation of a planetary gear unit of the hybrid drive apparatus.

The hybrid drive apparatus constructed as described above allows various modes of operation, using the engine (E/G) and the motor generator (M/G) as drive power sources, as shown in the table of operations of FIG. 2. These modes of operation include a first mode for starting the engine. During this first mode, only the brake B1 of the aforementioned three friction engagement elements is engaged to output torque from the motor generator (M/G), so that the sun gear S of the planetary gear unit P is driven while the ring gear R fixed to the case 9 serves as a fixed reaction element. Thus, rotation of the sun gear S is transferred to the output shaft 10 of the engine (E/G) via the flywheel F, thereby cranking the engine (E/G). In this case, the aforementioned three elements of the planetary gear unit P have a rotational drive relationship as indicated by the speed line diagram shown in FIG. 3. That is, while the ring gear R is set to a fixed speed ratio of "0" by the brake B1, rotation of the motor generator (M/G) is raised from the speed ratio of "0" toward a speed ratio of "−1" in a reverse direction, so that the carrier C is driven at the same speed ratio. As a result, rotation of the sun gear S is increased from the speed ratio of "0" in a forward direction to a speed ratio of "1" corresponding to the gear ratio of the planetary gear unit P. This rotation becomes the cranking rotation of the engine (E/G).

This drive apparatus is able to start the vehicle in the forward direction (FORWARD) in two different modes. One of the two vehicle starting modes is the third mode in FIG. 2, that is, the motor generator (M/G) is used to start the vehicle in motion. In this mode, the vehicle is powered by only the motor generator (M/G) as a drive source, without running the engine (E/G) and engaging only the first clutch C1. As the rotation of the carrier C is accelerated from the speed ratio of "0" to the speed ratio of "1" due to the output from the motor generator (M/G), while the sun gear S is held at a speed ratio of "0" due to the engine (E/G) not being in operation, the output from the motor generator (M/G) is directly input to the input shaft 12 of the transmission T via the carrier C while the ring gear R idles, thus determining the input shaft rotational speed.

The other vehicle starting mode is the second mode in FIG. 2, that is, an electrical torque converter (ETC) power mode in which the vehicle is started while reaction force of the drive power from the engine (E/G) is provided by the motor generator (M/G). In this mode, only the second clutch C2 is engaged while the engine (E/G) is operated at a rotational speed that achieves good fuel economy. Therefore, any amount of the engine output torque over that utilized for the running load is absorbed by the motor generator (M/G) operating in its generator mode. Torque is output from the ring gear R to the input shaft 12 of the transmission T with the three elements of the planetary gear unit P having the rotational drive relationship as indicated by the speed line diagram of FIG. 3. That is, while the sun gear S is driven at the speed ratio "1" by torque output from the engine (E/G), the rotational speed of the motor generator (M/G) is controlled so that the speed ratio of the motor generator (M/G) changes from "−1" to "1". Therefore, the ring gear R is accelerated from the speed ratio of "0" to a final ring gear speed ratio of "1", at which point the engine (E/G) and the motor generator (M/G) have the same speed ratio.

After achieving the above-described state wherein there is no longer any relative rotation among the three elements of the planetary gear unit P, the fourth mode in FIG. 2, that is, a locked-up running mode, is entered by engaging the first clutch C1. In this fourth mode, the two clutches C1, C2 are kept in the engaged states, so that the planetary gear unit P is in the locked-up state, in which the output torques of the motor generator (M/G) and the engine (E/G) are transferred to the input shaft 12 of the transmission T in a parallel fashion.

There are two modes for the reverse drive of the vehicle (REVERSE). One of the two modes is the sixth mode in FIG. 2, that is, a motor generator (M/G) running mode, which is substantially the same as the forward motor generator (M/G) running mode, except that the motor generator (M/G) is operated in reverse.

The other reverse mode uses the engine output torque when the torque output of the motor generator (M/G) is not sufficient or unavailable due to a low battery charge. More specifically, the fifth mode in FIG. 2, that is, a friction start mode, is achieved by holding the first clutch C1 in the engaged state while the engine (E/G) is producing torque at a predetermined rotational speed, and by gradually fixing the idling ring gear R to the case 9 through slipping engagement control of the brake B1. During this mode of operation, the engine output torque is transferred to the transmission T as an output from the carrier C, with the sun gear S serving as an input element and the ring gear R serving as a reaction element. With reference to the speed line diagram of FIG. 3, in an initial state where the speed ratio of the engine rotation is "1" and the speed ratio of the motor generator (M/G) is "0" and the ring gear R is idling at a predetermined rotation speed ratio, the idling of the ring gear R is braked. Therefore, as the speed ratio of the ring gear R gradually shifts toward "0", the carrier C is accelerated in the reverse direction from the speed ratio of "0" toward the speed ratio of "−1". As a result, the reverse rotation is transferred to the input shaft 12 of the transmission T connected to the carrier C through engagement of the first clutch C1.

Thus, as described above, the above-described modes can be achieved merely by selectively engaging the clutches and the brake as indicated in the table of FIG. 2. However, during the fifth mode (friction start), the starting of the vehicle must be controlled through the power transfer of the engine output via the planetary gear unit P. Although in the above-described vehicle starting procedure in the friction start mode, the engagement of the first clutch C1 is followed by the slipping engagement control of the brake B1, the sequence of engaging these elements may be reversed. The reason for adopting the above-described engaging sequence is related to the supply of pressure to the hydraulic servo of the first clutch C1 and the supply of lubricating oil to friction members of the first clutch C1, and will be explained in detail below. The above-described engagement sequence requires slip control of the brake B1 and, therefore the lubricating system in the present invention is needed for the lubrication of friction members of the brake B1.

In the above-described embodiment the ring gear R is the rotating member which is braked and brake B1 is the friction engagement element which engages the ring gear R with the case 9. As shown in a detailed sectional view of FIG. 4 taken in the axial direction, in the sectional view in FIG. 5 taken on line A—A of FIG. 4, and in the sectional view in FIG. 6 taken on line B—B of FIG. 4, the brake B1 includes a hub 2 that has a structure integrated with the ring gear R, friction members 3 disposed between the hub 2 and the case 9, and a hydraulic servo 4 for engaging the friction members 3. The brake B1 further has an oil passage L for supplying lubricant from the case 9 to the friction members 3 in order to cool and lubricate the friction members 3.

Figure 4:
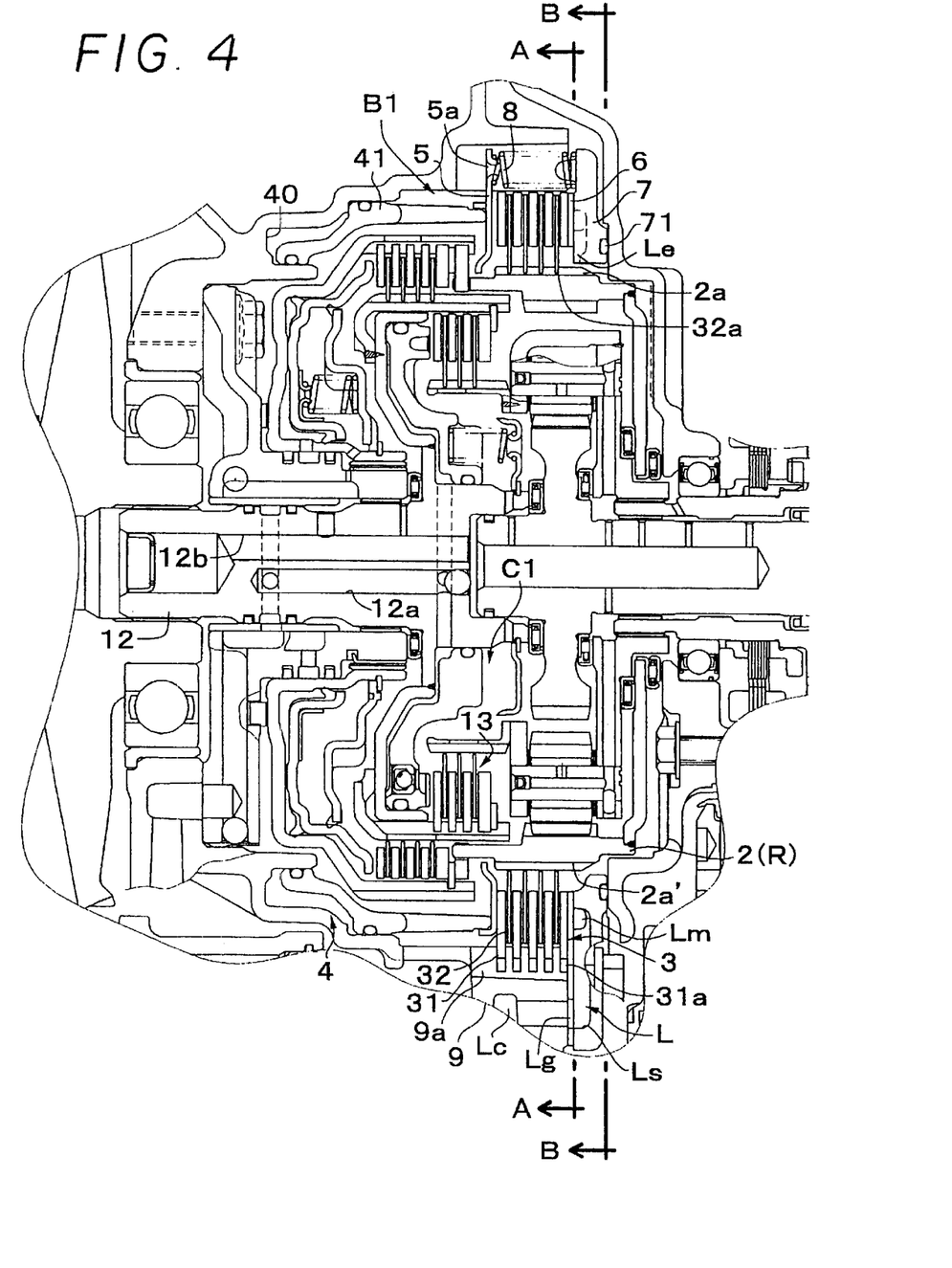
FIG. 4 is a partial sectional view of the hybrid drive apparatus taken on a plane that includes an axis of the apparatus.
Figure 5:
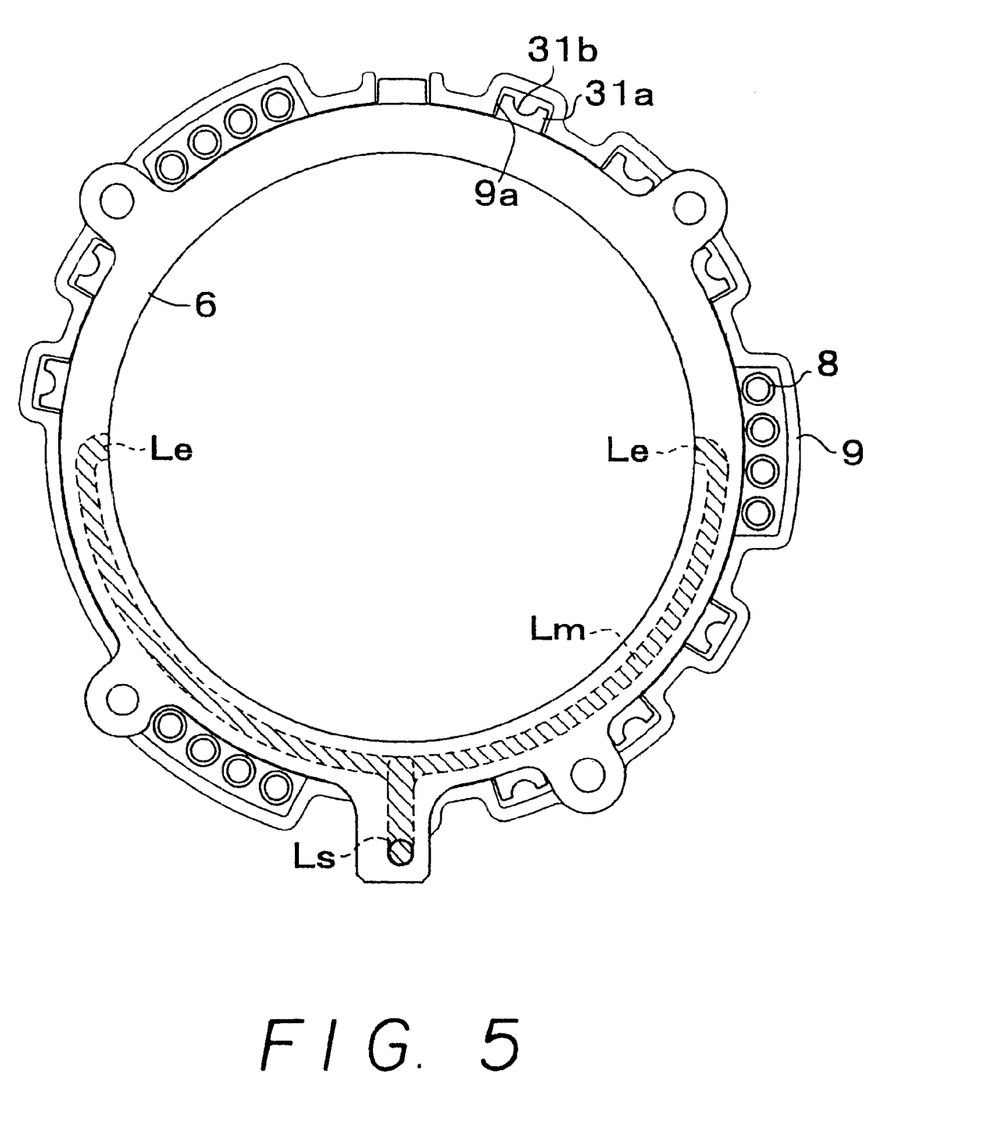
FIG. 5 is a sectional view taken on line A—A in FIG. 4.

Oil discharge openings Le of the oil passage L are formed at sites that are radially inward of and axially to one side (right side in FIG. 4) of the friction members 3. As seen in FIG. 5, a pair of oil discharge openings Le are directed toward the friction members 3, and are diametrically opposed to each other. Further provided on the axially opposite side of the friction members 3 (the left side in FIG. 4) is a weir member 5 for restricting escape of lubricant axially through the gap between the hub 2 and the friction members 3.

The brake B1 has a plurality of separator plates 31 that form a group of friction members 3, and a plurality of friction discs 32 disposed between the separator plates 31. The separator plates 31 are supported on the drive apparatus case 9 and held against rotation by engagement of outer peripheral splines (keys) 31a of the separator plates 31 (see FIG. 5) with inner peripheral keyways 9a of the case 9. The friction discs 32 are supported on the brake hub 2, which is formed by the ring gear R of the planetary gear unit P, and held against rotation by engagement between inner peripheral splines 32a of the friction discs 32 and outer peripheral splines 2a of the hub 2. In this embodiment, for the spline engagement, the hub 2 has a total of 32 keys in the arrangement of outer peripheral splines 2a wherein every fifth key is absent from a basic spline arrangement of 40 keys. A brake cover 7 and an oil guide plate 6 forming reaction members (reaction plates) are axially disposed between one side of the friction members 3 and an end face of the case 9 facing the friction members 3.

The hydraulic servo 4 is axially disposed at the other side of the friction members 3, opposite cover 7 and plate 6. The hydraulic servo 4 is formed by a cylinder 40, that is a portion of the case 9, and a piston 41 slidably mounted in the cylinder 40. An annular plate-shaped return spring support 5, that is also the weir member, is disposed between the face of the piston 41 and the friction members 3. The return spring support 5 has three spring stopper portions 5a that extend axially outward from an outer periphery of the return spring support 5 and that are located in recesses of the case 9. Each of the three spring stopper portions 5a is provided with four return springs 8 in the form of compressed coil springs. The return springs 8 are connected at an end thereof to respective spring stopper portions 5a by crimping. The other end of each return spring 8 abuts against and is supported by an end face of the brake cover 7, which also serves as a return spring plate. Thus, in response to oil pressure supplied to the cylinder 40, the face of piston 41 presses against and engages the friction members 3 via the return spring support 5. The force thus exerted on the friction members 3 is borne by the case 9 via the oil guide plate 6 and the brake cover 7, serving as reaction plates. Four bolts fasten the oil guide plate 6 and the brake cover 7 to the case 9. Due to the engagement of the friction members 3, the ring gear R integral with the brake hub 2 is engaged with the case 9.

Figure 6:
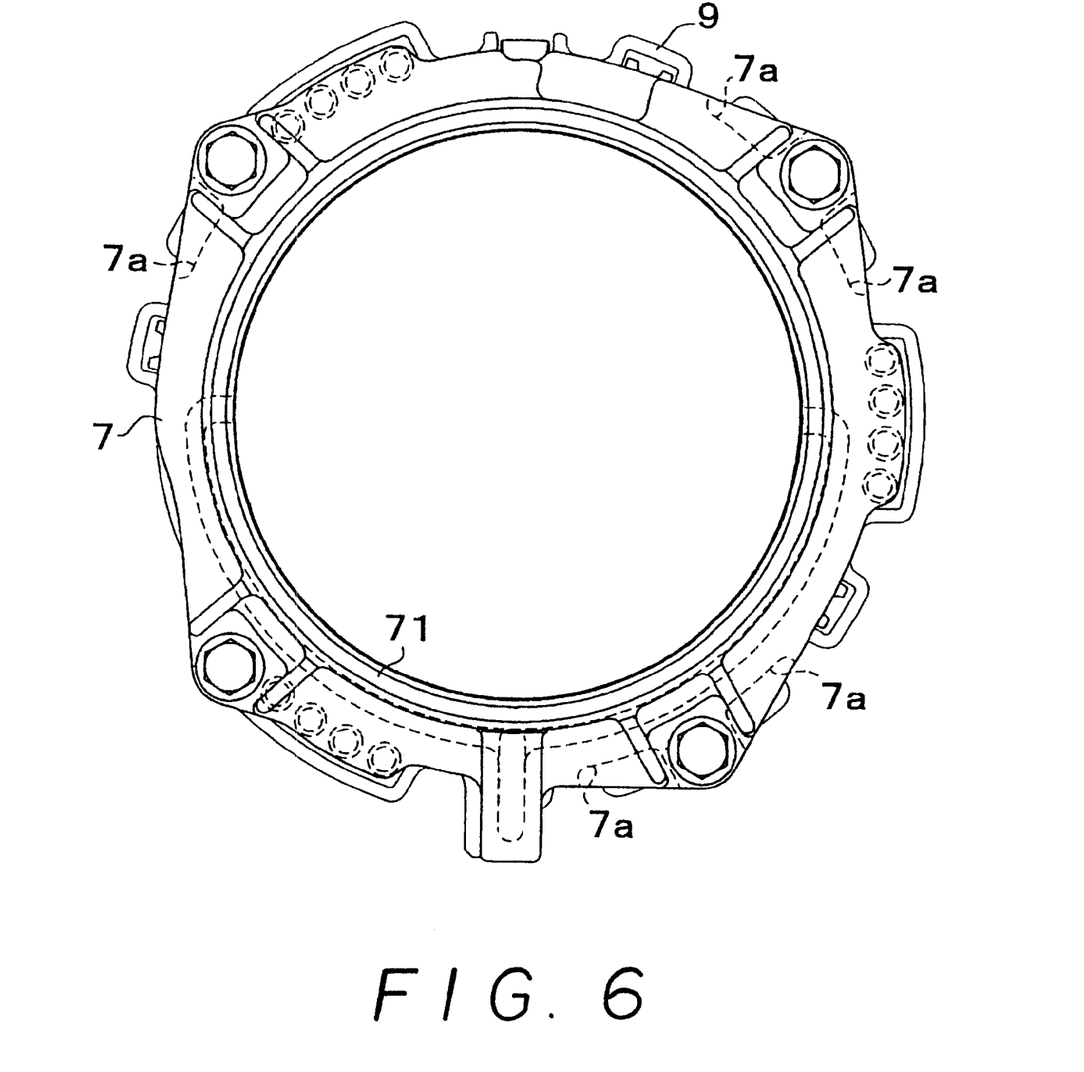
FIG. 6 is a sectional view taken on line B—B in FIG. 4.

The oil passage L, for lubricating and cooling the friction members 3, includes an oil passage Lc in the case 9 connected to a valve body (not shown), an axially directed oil opening Lg formed in the oil guide plate 6 which is axially aligned with an opening of the oil passage Lc, and an oil groove in the brake cover 7 extending from a groove beginning end Ls, axially aligned with oil opening Lg, to the groove terminal ends ("oil discharge openings") Le The oil groove in the brake cover 7 has a generally semicircular shape extending along one end face of the brake cover 7 which is die-cast as an annular aluminum plate (the shape is indicated by hatching in FIG. 5). A groove beginning at Ls is located at an end portion of a groove extending radially outward from an intermediate portion of a semicircular groove Lm. The groove terminal ends Le extend radially inward from the opposite ends of the semicircular groove Lm to the inner periphery of the brake cover 7. The groove terminal ends Le form two discharge openings that are located on the circumference of a circle and that face each other. Each groove terminal end Le is provided with an inclined groove bottom so as to direct released oil toward an oil reservoir. The oil grooves Ls, Lm, Le in the brake cover 7 form an oil passage closed by a face of the oil guide plate 6 which is a pressed steel sheet article. In order to prevent oil leakage through a gap between the oil guide plate 6 and the brake cover 7, the oil guide plate 6 and the brake cover 7 are fastened together at four locations around their circumference by bolts, and are thereby pressed against an end face of the case 9, as shown in FIG. 6. This manner of fixation is different from that of an ordinary reaction plate which has a snap ring that allows play in the axial direction.

The inner peripheral surface of the brake cover 7 has such an inside diameter set to provide the smallest-possible clearance from the key tops, i.e. the outer peripheral surface of the outer peripheral splines 2a of the hub 2, which avoids interference with the turning of the splines 2a. At this site, it is impossible to prevent oil leakage along the key bottoms or grooves of the splines 2a. Therefore, at a site axially outward of the brake cover 7 (right side in FIG. 4), the gap between the outer periphery of the ring gear R integral with the hub 2 and the inner surface of the case 9 located radially outward of the outer periphery of the ring gear R is set to the smallest-possible clearance which can avoid interference with the turning of the ring gear R. Thus, leakage of oil axially along the outer periphery of the ring gear R is restricted. Furthermore, a gap between the brake cover 7 and an end face of the case 9 facing the brake cover 7 is sealed by an O-ring 71 that is mounted in a seal ring groove of the brake cover 7, so that oil leakage radially along the outer end face of the brake cover 7 is prevented. Thus, leakage of lubricant from the gap between the inner peripheral face of the brake cover 7 and the outer periphery of splines 2a of the hub 2 is restricted at a downstream side with respect to the flow of lubricant.

The return spring plate 5, which also serves as a weir, is disposed at a side of the friction engagement element 3 axially opposite the brake cover 7, and has its radially innermost end bent to form a step away from element 3 (to the left in FIG. 4) so that end will not interfere with splines 2a of the hub 2 during movement of the return spring sheet 5 with a stroke of the piston of the hydraulic servo 4. In FIG. 4, the portion above the center axis illustrates the state wherein the piston is retracted, and the portion below the center axis illustrates the state where the piston is advanced. The radially innermost edge of the return spring plate 5 has a diameter which provides the smallest possible clearance from the outer peripheral surface of the ring gear R that avoids interference with the turning of the ring gear R. Therefore, the oil leakage from the annular clearance between the radially inner edge of member 5 and the outer peripheral face of the hub 2, integral with the ring gear R, is minimized.

In the above-described arrangement, lubricant reservoir spaces are interconnected via eight gaps 2a' on the periphery of the hub 2 provided by omission of eight keys from the 40-key (spline) arrangement 2a of the hub 2 in which the omitted key sites are equidistantly distributed around the circumference. These gaps 2a' are defined between the outer peripheral face of the ring gear R (brake hub 2) and the inner peripheral edges of the separator plates 31 of friction element 3. Therefore, if a large quantity of oil is supplied into the reservoir spaces, the lubricant is discharged to the outer peripheral side of the friction members of element 3 mainly via the gaps between the friction discs 32 and the separator plates 31 by centrifugal force developed early in braking when there is rotation of the hub 2 and the friction discs 32. Later in a braking, when there is substantially no rotation of the hub 2 and the friction discs 32, the lubricant is discharged to the outer peripheral side of the friction members 3 mainly via escape grooves (not shown) formed in the engagement surfaces of the friction discs 32 due to the oil pressure. The friction members 3 release heat to the lubricant flow, and are thereby cooled.

In order to smoothly discharge lubricant after the lubricant cools and lubricates the friction members 3 and to secure a sufficient amount of flow of lubricant, a cutout 31b is formed along the top of each of eight keys 31a of the separator plates 31 engaged within the spline recesses (keyways) 9a of the case 9. These cutouts 31b, together with the corresponding keyway 9a bottoms of the case 9, define discharge passages that extend across the separator plates 31 to the ends of the spline keyways 9a of the case 9. In FIG. 5, the uppermost spline key 31a does not have a cutout in its top surface because the keyway bottom of the corresponding keyway 9a of the case 9 is cut open to provide a flow of oil therethrough.

Figure 7:
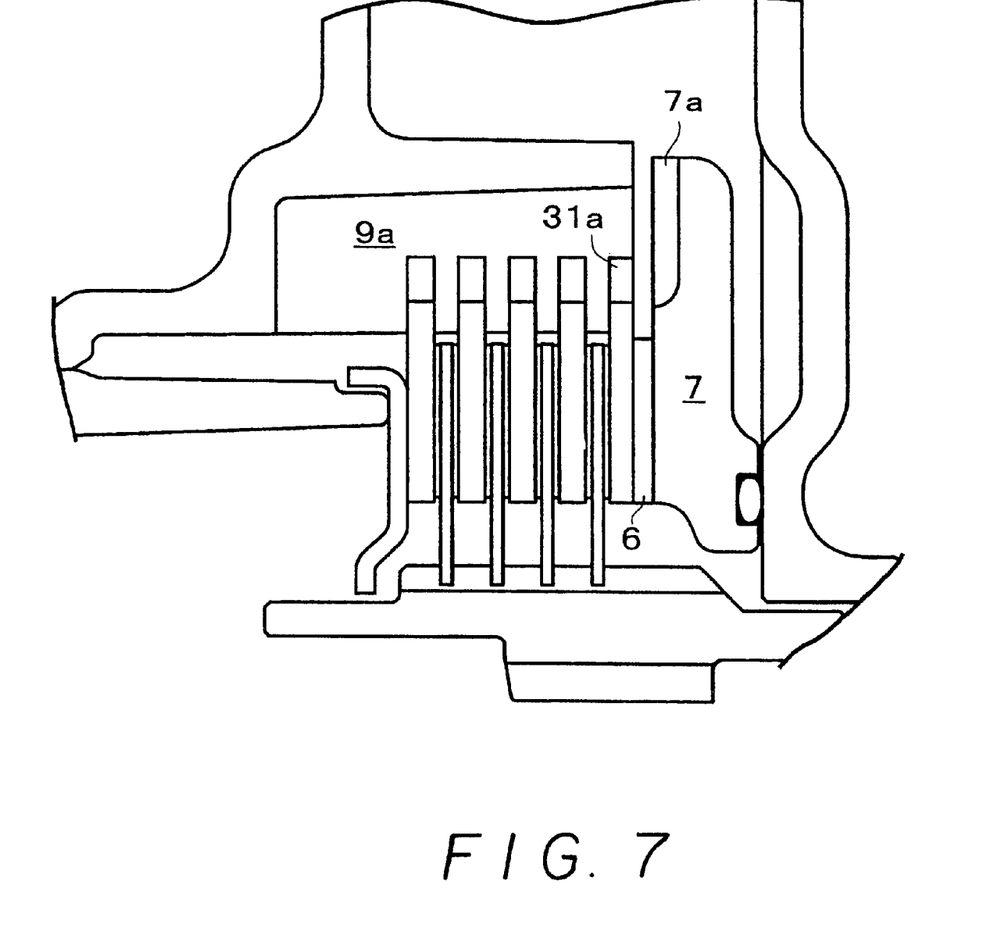
FIG. 7 is an enlarged partial sectional view showing a section of the hybrid drive apparatus that includes the axis of the apparatus but is different from the section of FIG. 4.

As shown in FIG. 6, cutouts 7a are formed at five circumferentially spaced sites on the surface of the brake cover 7 that faces the friction element 3. The cutouts 7a are axially aligned with keyways 9a of the case 9 that are substantially closed by bolt-fastening portions of the brake cover 7 which extend radially outward to provide for fastening the brake cover 7 together with the oil guide plate 6 to the case 9. The cutouts 7a have a groove shape that is slightly wider than the width of the keyways 9a, that extends radially outward from a position on the separator plates 31 corresponding to the keyways of the splines 9a, and that forms an opening in the outer peripheral surface of the brake cover 7, as shown in the enlarged view of FIG. 7. The cutouts 7a promote the discharge of the oil that has cooled the friction members, from the brake cover 7 side of the keyways 9a of the case 9.

The slipping engagement control of the brake B1 follows the engagement of the first clutch C1 in a reverse start for reasons which will now be explained. As is apparent from the sectional structure shown in FIG. 4, the first clutch C1 in this drive apparatus is disposed radially outward of the input shaft 12 of the transmission T. The input shaft 12 has two parallel oil passages, that is, a supply oil passage 12a for supplying hydraulic pressure to the hydraulic servo of the first clutch C1 and a lubricant supply oil passage 12b for lubricating a bearing. In slip control of the first clutch C1, it is desirable to cool friction members 13 of the first clutch C1 by supplying a large quantity of lubricant. To that end, however, it becomes necessary to form another oil passage in the input shaft 12. However, a third oil passage remarkably reduces the strength of the input shaft 12. If this reduction of the shaft strength were to be compensated for by increasing the shaft diameter, it would become necessary to increase the radial dimension of all the elements disposed radially around the input shaft 12 and, therefore, the entire apparatus would be increased in size and weight. For these reasons, the object of the present invention is to provide slipping engagement control for the brake B1, with lubrication supplied from the case side, rather than from the input shaft side.

In the lubricating apparatus constructed as described above, lubricant is supplied to the inside of the friction members 3 from the two discharge openings Le that are located on the circumference of a circle and face each other, via the oil passage Lc in the drive apparatus case 9, the oil opening Lg formed in the oil guide plate 6, the groove beginning end Ls of the brake cover 7, and the semicircular groove Lm. The oil flowing out of the discharge openings Le is axially directed by the inclined groove at the supply opening Le, and therefore has a stream momentum in the axial direction. Hence, the flow toward the clearance between the hub 2 and the brake cover 7 is restricted. The supplied oil flows through the key-omitted gaps 2a' on the surface of the hub 2 that are equidistantly spaced around the circumference of the hub 2. After reaching the opposite axial end of the inside of the friction members 3, the oil still has stream momentum, and therefore tends to escape out through the annular clearance between the weir member (return spring plate) 5 and the hub 2. However, since the clearance is small, the loss of oil is minimal.

After being distributed into the gaps between the friction discs 32, the oil flows radially outward between the friction discs 32 and the separator plates 31 due to the oil pressure and the centrifugal force caused by the rotation of friction discs 32. The oil absorbs heat during this radially outward flow, and reaches the keyways 9a of the spline arrangement of the case 9.

After reaching the bottoms of the keyways 9a, the oil flows through the oil passages defined by the keyway bottoms of the case 9 and the cutouts 31a of the key top surfaces of the splines of the separator plates 31, and returns to the oil reservoir through the case opening formed at the terminal end portion of the keyways 9a.

The brake cover 7 serves as the member in which an oil passage is formed, as a reaction plate and as a return spring support plate. Further, the weir member 5 both restricts lubricant leakage in the axial direction and serves as another return spring support plate. Thus, without any increase in the number of component parts, this simple construction is able to sufficiently cool the friction members 3 that produce a great amount of heat during slip control.

Furthermore, the key-omitted gaps 2a' on the outer surface of the hub are utilized for delivery of lubricant in the axial direction. This construction eliminates the need for position alignment during assembly in the mounting of the plurality of friction members 3 on the hub 2, and therefore provides easier assembly, as compared with a construction in which delivery of lubricant in the axial direction is accomplished by omitting keys from the friction member-side spline arrangement and with a construction in which an oil passage is formed in the friction members.

Furthermore, since a major portion of the oil passage is formed as a groove in a member (cover 7), the major portion of the oil passage can be formed by an inexpensive processing method such as die-casting or the like. Still further, as compared with the conventional construction, the axial dimension (thickness) of the member for forming the oil passage is reduced to avoid need for increase in the overall axial dimension of the entire apparatus.

Therefore, in the hybrid drive apparatus of the present invention, the rotation input to the transmission T can be gradually increased in a rotational direction opposite that of the direction of rotation of the engine (E/G), through the slip control of the brake friction element 3. Hence, it becomes possible to achieve a smooth start of the vehicle in a friction start mode, by engine power alone when the battery charge is low.

While the invention has been described with reference to an embodiment in which the invention is applied to an electric torque converter type hybrid drive apparatus, the invention is not limited to the disclosed embodiment. On the contrary, the invention is also applicable to, for example, an automatic transmission in which a CVT is adopted as a speed shift apparatus without a torque converter, as in the conventional art described above. Still further, the invention is applicable to a hybrid drive apparatus employing a single-pinion type planetary gear unit, as well as a hybrid drive apparatus employing double-pinion type planetary gearing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A friction engagement element and lubricating system comprising:
   a case;
   a friction engagement element, housed within said case, for engaging a rotatable member with said case, the friction engagement element including a hub connected to the rotatable member, at least one friction member centered on an axis and disposed between the hub and the case, and an oil passage;
   a discharge opening of the oil passage located radially inward of and spaced from the friction member, on a first axial side of the friction member, for supplying a lubricant from the case onto the friction member; and
   a weir member positioned at a second axial side of the friction member, opposite said first axial side, said weir member extending radially inward from a radially outer portion, located radially outward of said friction member, to its radially innermost edge which is located radially inward of said friction member and which is spaced from said hub to define a gap therebetween, said gap restricting escape of the lubricant axially between the hub and the friction member.

2. A friction engagement element and lubricating system according to claim 1, wherein the hub and the friction member are connected by a spline arrangement in which spline keys of the hub are omitted at positions equidistantly and circumferentially spaced.

3. A friction engagement element and lubricating system according to claim 2, wherein the weir member extends radially inward to a location that is radially inward of the periphery of a splined surface of the hub.

4. A friction engagement element and lubricating system according to claim 1, further comprising a hydraulic servo for engaging said friction engagement element and a reaction member that is provided at the first axial side of the friction member and that is supported by the case to bear a force exerted on the friction member by actuation of said hydraulic servo, and
   wherein said oil passage is connected to a lubricant supply passage provided in the case, and the oil passage and the discharge opening of the oil passage are formed in the reaction member.

5. A friction engagement element and lubricating system according to claim 4, further comprising a return spring that is located radially outward of the friction member, and that is supported at its opposing ends between the weir member and the reaction member.

6. A friction engagement element and lubricating system according to claim 4, wherein the oil passage is defined by a groove formed in the reaction member and a lid member attached to the reaction member, and the discharge opening of the oil passage and the lubricant supply passage formed in the case are interconnected by an oil passage defined by a circumferential groove formed in the reaction member and the lid member.

7. A friction engagement element and lubricating system according to claim 4, wherein the reaction member has a cutout in a surface facing the case.

8. A friction engagement element and lubricating system according to claim 1, having plural discharge openings for said oil passage, said plural discharge openings being circularly arranged and facing each other.

9. A friction engagement element and lubricating system according to claim 1, wherein the friction member has a cutout in a radially outer edge.

10. A drive train for a vehicle, said drive train comprising:
    a friction engagement element and lubricating system according to claim 1;
    an engine;
    a planetary gear unit including three elements; and
    a transmission;
    wherein an output shaft of the engine is connected to one of the elements of the planetary gear unit, an input shaft of the transmission is connected to a second one of the elements of the planetary gear unit, and the friction engagement element is a brake for engaging a third one of the elements of the planetary gear unit with the case.

11. A friction engagement element and lubricating system according to claim 1 wherein said friction engagement element comprises plate elements splined to said case intermeshed with disc elements splined to and rotatable with said hub and wherein said friction member is a plate element.

* * * * *

UNITED STATES PATENT AND TRADEMARK OFFICE
CERTIFICATE OF CORRECTION

PATENT NO.    : 6,662,904 B2
DATED         : December 16, 2003
INVENTOR(S)   : Omote et al.

It is certified that error appears in the above-identified patent and that said Letters Patent is hereby corrected as shown below:

Title page,
Item [57], ABSTRACT, please substitute the following:
-- A lubricating apparatus for a friction engagement element that includes a hub connected to a rotatable member, friction members disposed between the hub and the case, a hydraulic servo for engaging the friction members, and an oil passage for supplying lubricant from the case to the friction members. A discharge opening of the oil passage is formed radially inward of the friction members and axially to a side of and directed toward the friction members. A weir restricting escape of lubricant axially through a gap between the hub and the friction members is provided at the other axial side of the friction members. A radially outward stream of oil between the friction members is secured, and the friction members can be reliably cooled to remove heat generated by slip control of the friction engagement element. --

Signed and Sealed this

Sixteenth Day of November, 2004

JON W. DUDAS
*Director of the United States Patent and Trademark Office*